US006616332B1

(12) United States Patent
Renken et al.

(10) Patent No.: US 6,616,332 B1
(45) Date of Patent: Sep. 9, 2003

(54) OPTICAL TECHNIQUES FOR MEASURING PARAMETERS SUCH AS TEMPERATURE ACROSS A SURFACE

(75) Inventors: Wayne Renken, San Jose, CA (US); Mei H. Sun, Los Altos, CA (US); Arwa Ginwalla, Sunnyvale, CA (US)

(73) Assignee: SensArray Corporation, Santa Clara, CA (US)

( * ) Notice: Subject to any disclaimer, the term of this patent is extended or adjusted under 35 U.S.C. 154(b) by 0 days.

(21) Appl. No.: 09/442,413

(22) Filed: Nov. 18, 1999

(51) Int. Cl.[7] .............................................. G01K 11/12
(52) U.S. Cl. ...................... 374/162; 374/106; 116/216; 219/444.1
(58) Field of Search ................. 374/106, 137, 374/162, 161; 116/216; 219/444.1, 802; 392/418; 118/724, 725

(56) References Cited

U.S. PATENT DOCUMENTS 3,661,142 A * 5/1972 Flam ........................ 374/162
3,763,647 A * 10/1973 Shibanai ..................... 368/235

(List continued on next page.)

FOREIGN PATENT DOCUMENTS

| DE | 2728439 | | 5/1979 | | |
|----|---------|---|--------|---|---|
| JP | 58-026236 | | 2/1983 | | |
| JP | 6315958 | | 4/1988 | | |
| JP | 2186229 | | 7/1990 | | |
| JP | 02186229 | * | 7/1990 | ................. | 374/163 |
| JP | 405107212 | * | 4/1993 | .................... | 374/4 |
| JP | 09166501 | * | 6/1997 | | |
| JP | 1123381 | | 1/1999 | | |
| JP | 11123875 | | 5/1999 | | |
| SU | 1045010 | * | 9/1983 | ................. | 374/162 |

OTHER PUBLICATIONS

"Method for Determining Wafer Temperature During Polishing", IBM Technical Disclosure Bulletin, vol. 24, Issue No. 6, p. 3021, Published Nov. 1, 1981.*
Gabriel, C.T. et al., "In Situ Wafer Temperature Measurement During Plasma Etching," *Solid State Technology—Metrology*, pps. 99–106, Oct. 1999.
Brochure of Tempil, Inc., Catalog GC 96 (1998) pps. 2–11.
Brochure of Reatec AG, (1998) two pages.
Brochure of Wahl Instruments, Inc., (1996) pps. 44–46.

*Primary Examiner*—Diego Gutierrez
*Assistant Examiner*—Lydia M. De Jesús
(74) *Attorney, Agent, or Firm*—Parsons Hsue & de Runtz LLP

(57) ABSTRACT

A sensor of a parameter such as temperature includes an indicator encapsulated within a rigid enclosure, wherein the sensor has a characteristic that varies with the parameter that is detectable upon illumination with electromagnetic radiation through a window of the enclosure that is transparent to the radiation. In a specific example, the indicator changes an optical characteristic such as its color as a function of its temperature, and may be of an irreversible type in order to indicate the peak temperature reached. The sensor may include a pattern of such indicators that have different peak temperatures to which they respond, so that the sensor gives a unique visual pattern at each temperature within its measurement range. This pattern may be viewed directly or processed by computer to compare the pattern with those which indicate known temperatures. The sensor and system utilizing it have particular advantages for operation in a vacuum, and/or under ion bombardment, such occurs in plasma etching and deposition machines, and/or within a strong electromagnetic field, such as within the radio frequency and microwave frequency ranges. An array of such sensors positioned across a surface of a thermally conductive substrate is especially useful for measuring a temperature distribution occurring across semiconductor wafers in wafer processing machinery.

19 Claims, 6 Drawing Sheets

U.S. PATENT DOCUMENTS

| | | | |
|---|---|---|---|
| 3,877,411 A | * 4/1975 | MacDonald | 116/207 |
| 3,922,917 A | * 12/1975 | Ayres | 374/106 |
| 3,998,098 A | * 12/1976 | Chilton | 374/106 |
| 4,030,482 A | * 6/1977 | Navato | 374/162 |
| 4,064,872 A | 12/1977 | Caplan | |
| 4,101,696 A | 7/1978 | Jennen et al. | |
| 4,137,769 A | * 2/1979 | Parker | 374/134 |
| 4,154,107 A | 5/1979 | Giezen et al. | |
| 4,232,552 A | * 11/1980 | Hof et al. | 116/201 |
| 4,248,089 A | 2/1981 | Heinmets | |
| 4,279,152 A | * 7/1981 | Crossland | 374/162 |
| 4,296,631 A | * 10/1981 | Fergason | 374/104 |
| 4,459,046 A | 7/1984 | Spirg | |
| 4,469,452 A | * 9/1984 | Sharpless et al. | |
| 4,682,605 A | 7/1987 | Hoffman | |
| 4,779,995 A | * 10/1988 | Santacaterina et al. | 374/162 |
| 4,829,539 A | * 5/1989 | Angus et al. | 374/159 |
| 4,878,588 A | * 11/1989 | Ephraim | 374/150 |
| 4,891,250 A | * 1/1990 | Weibe et al. | 374/162 |
| 4,931,420 A | * 6/1990 | Asano et al. | 503/205 |
| 4,933,525 A | * 6/1990 | Phillips | 219/725 |
| 5,131,755 A | 7/1992 | Chadwick et al. | |
| 5,159,564 A | 10/1992 | Swartzel et al. | |
| 5,265,957 A | 11/1993 | Moslehi et al. | |
| 5,282,684 A | * 2/1994 | Holzer | 116/216 |
| 5,401,100 A | * 3/1995 | Thackston et al. | 374/208 |
| 5,484,205 A | * 1/1996 | Grupp et al. | 374/142 |
| 5,580,172 A | * 12/1996 | Bhardwaj et al. | 374/137 |
| 5,658,833 A | * 8/1997 | Chen et al. | 438/791 |
| 5,673,028 A | * 9/1997 | Levy | 116/216 |
| 5,718,511 A | 2/1998 | Mundt | |
| 5,798,404 A | 8/1998 | Monty et al. | |
| 5,953,449 A | * 9/1999 | Matsuda et al. | 382/162 |
| 5,969,639 A | * 10/1999 | Lauf et al. | 340/870.17 |
| 6,033,107 A | * 3/2000 | Farina et al. | 374/5 |
| 6,126,744 A | * 10/2000 | Hawkins et al. | 117/85 |

* cited by examiner

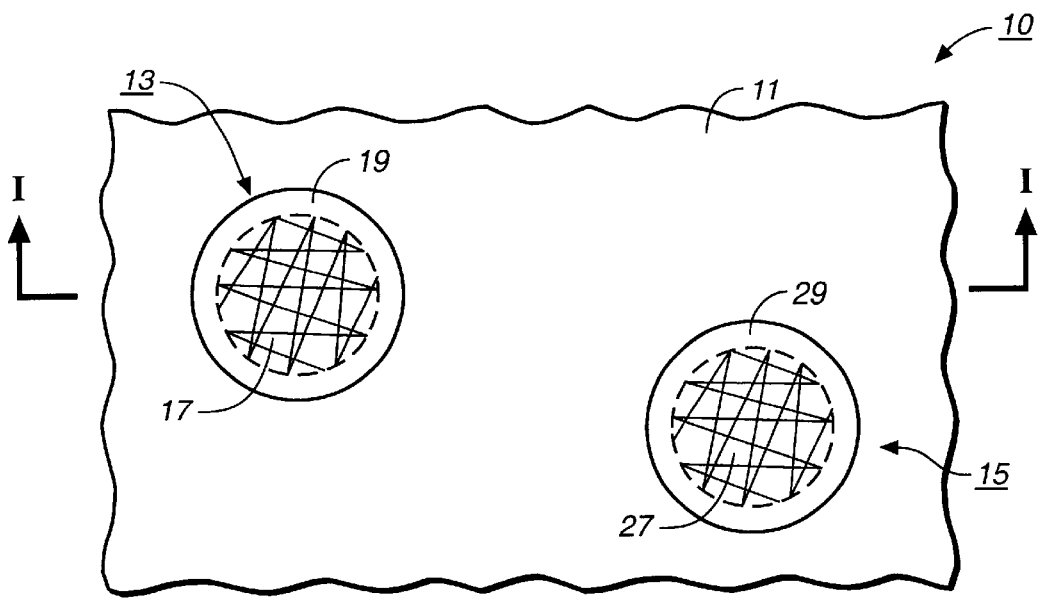
FIG._1
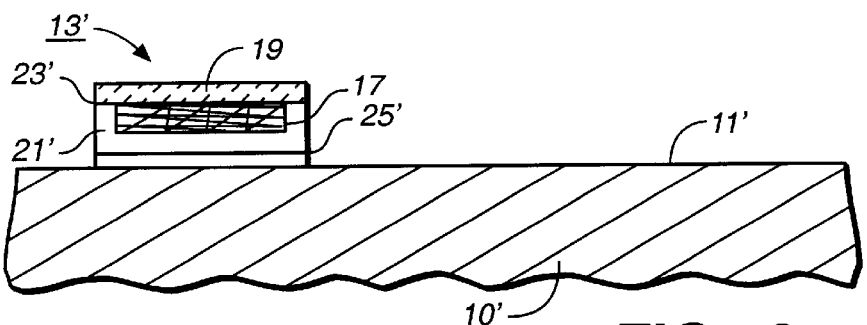
FIG._2
(Section I-I)
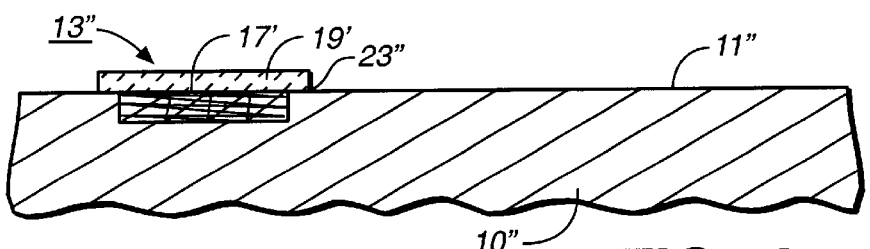
FIG._3
(Section I-I)

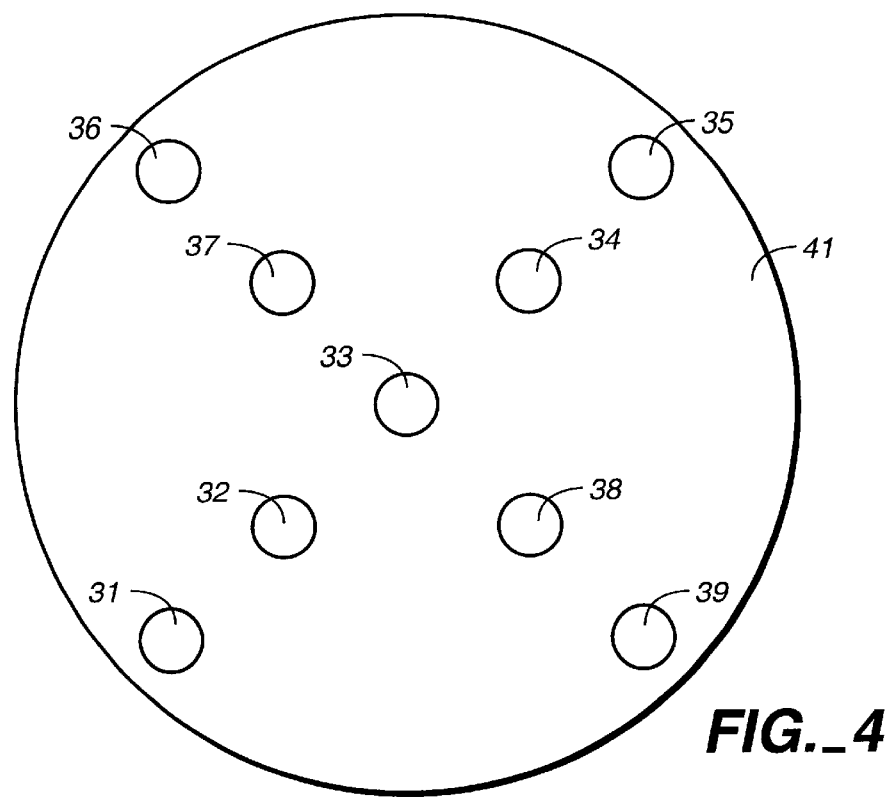
FIG._4
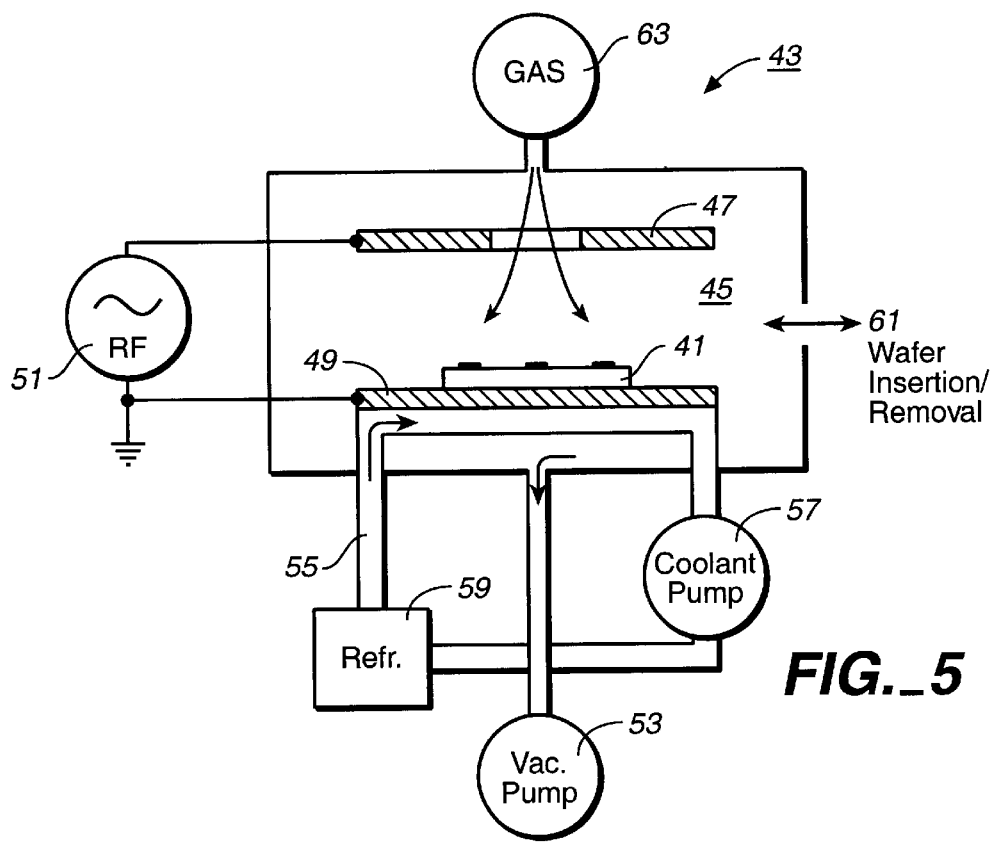
FIG._5

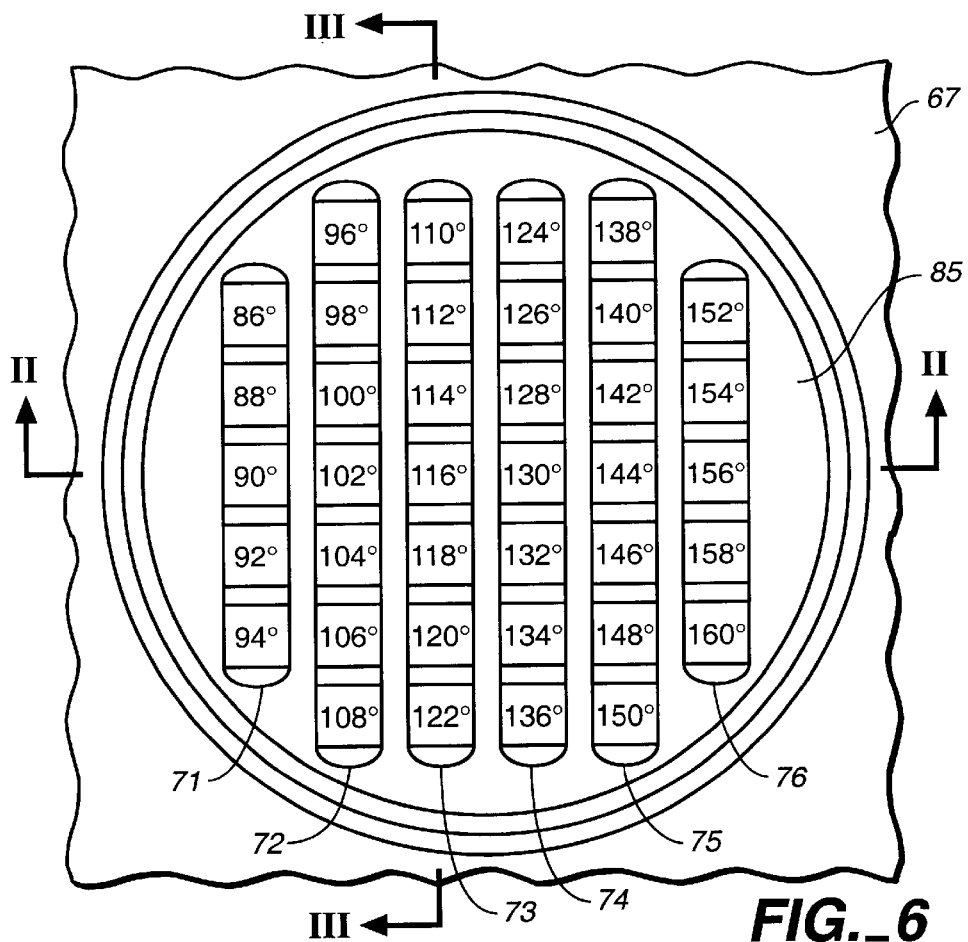
FIG._6
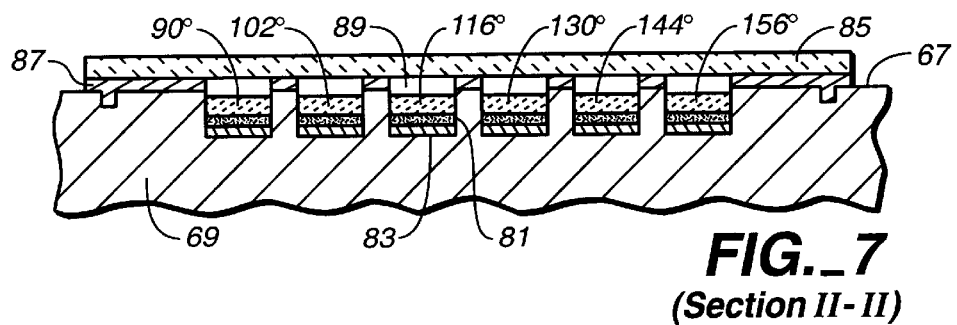
FIG._7
(Section II-II)
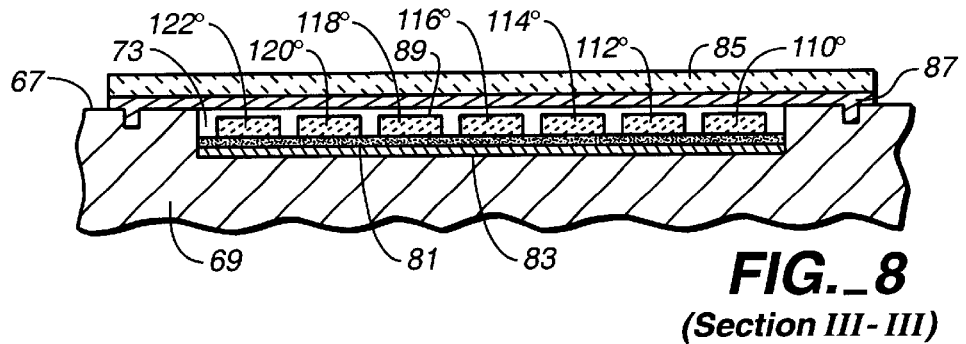
FIG._8
(Section III-III)

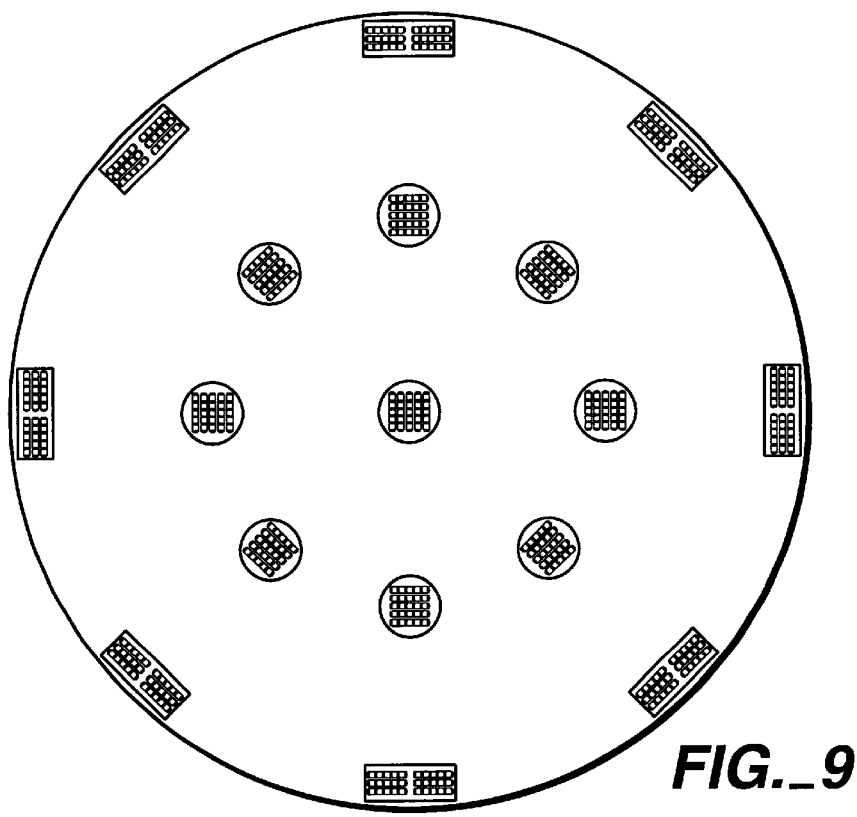
FIG._9
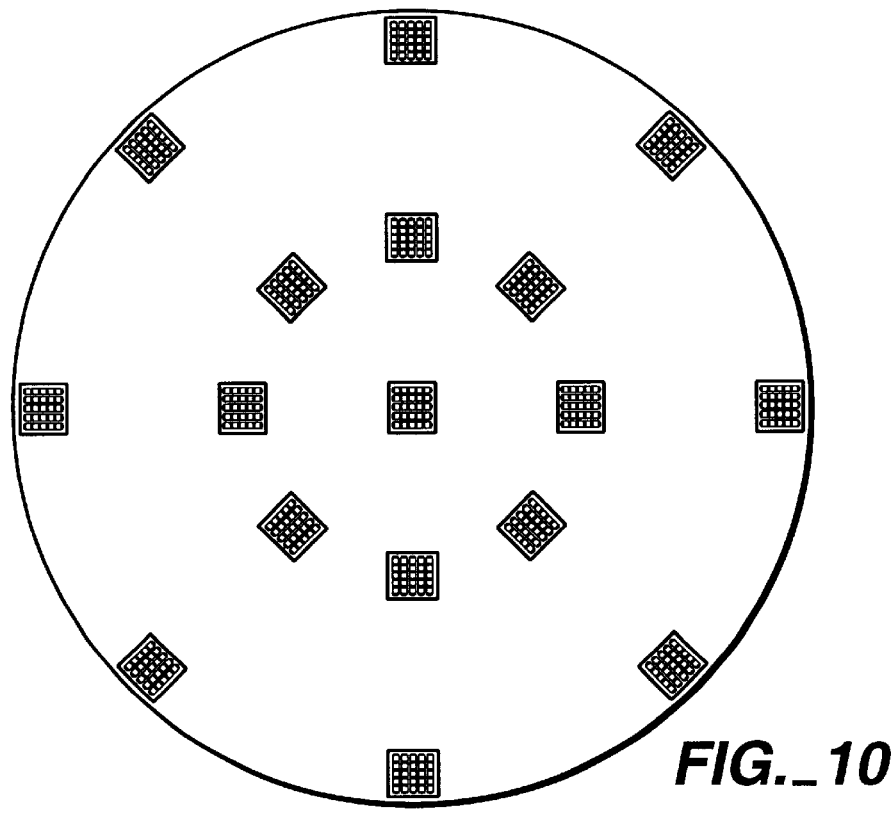
FIG._10

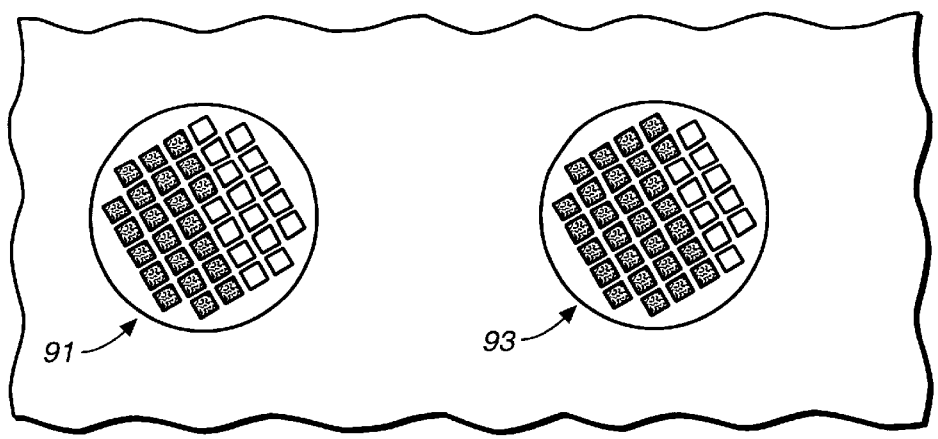
FIG._11
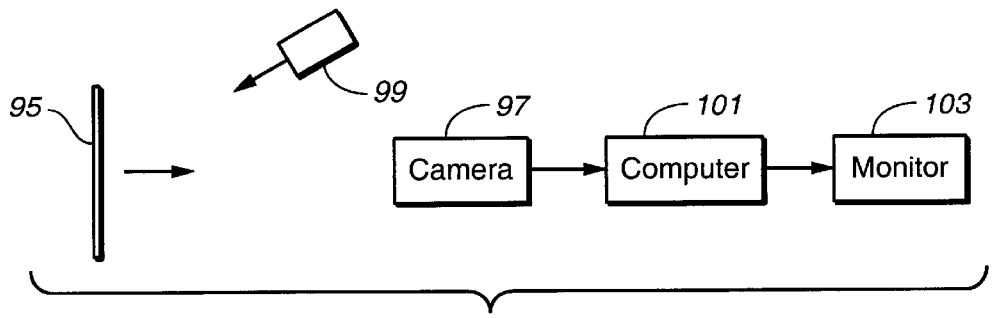
FIG._12
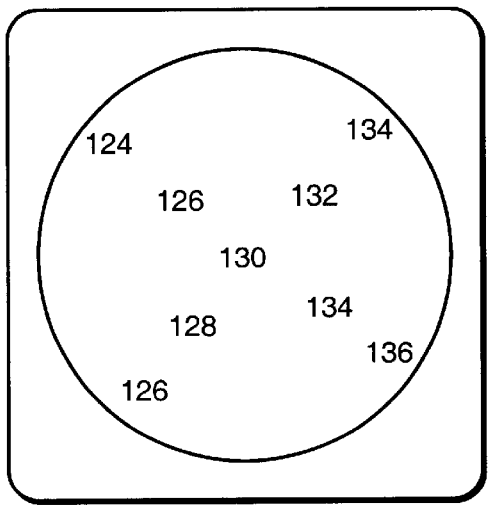
FIG._13
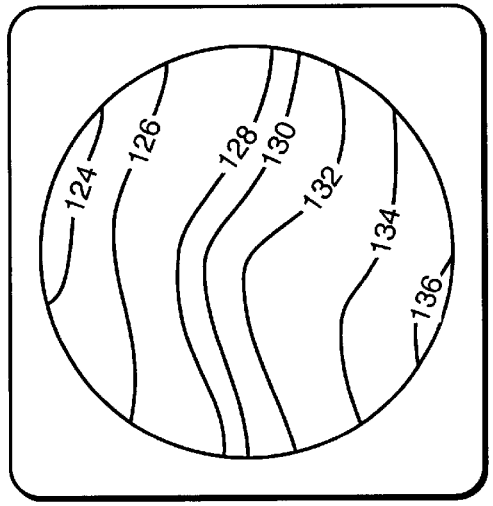
FIG._14

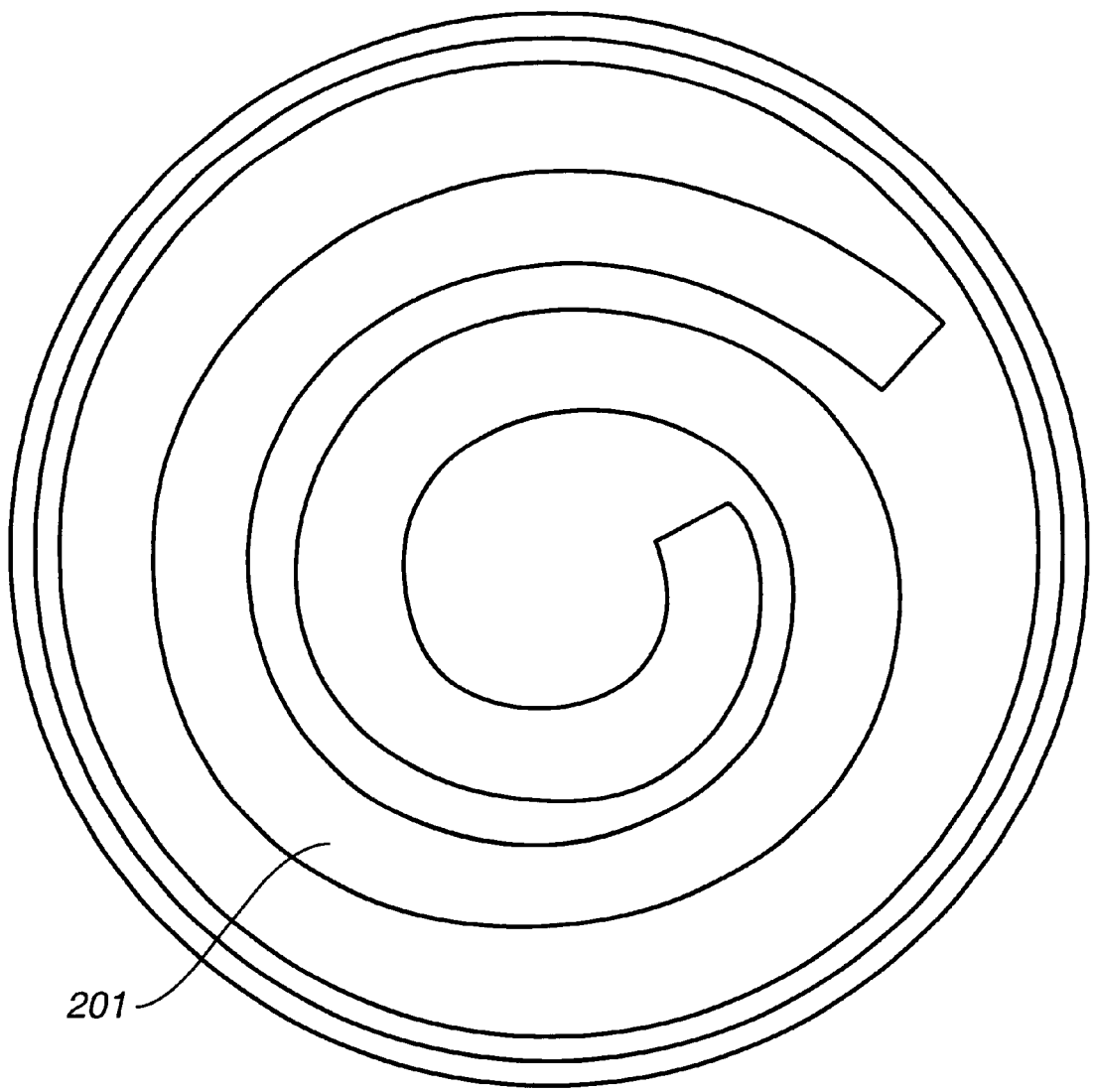
FIG._15

OPTICAL TECHNIQUES FOR MEASURING PARAMETERS SUCH AS TEMPERATURE ACROSS A SURFACE

BACKGROUND OF THE INVENTION

This invention relates generally to sensors of parameters, particularly to a class of sensors that from which values of the measured parameters are communicated by a radiation link, without the need for wires or other physical link to the sensors.

Applications of sensors to measure various physical, electrical and chemical parameters are numerous. Each such sensor is, to the extent possible, adapted to optimally perform in a specific application or range of applications to measure one or more parameters. This includes making a sensor of a particular parameter as insensitive as practical to variations of other parameters in the environment in which the sensor is placed. This also includes making the sensor of a configuration and set of materials to minimize any effect on the environment in which it is placed that could alter the parameter being measured. Further, a method of communicating a signal related to the measured parameter between the sensor and a measuring device is also chosen to be consistent with the application and the environment.

One such sensor application measures a parameter, such as temperature, on a surface of an object. One specific class of surface temperature measuring devices includes indicators that change in a visually perceptive manner as a function of temperature. Such sensors are attached to the surface being measured and the temperature dependent visual indications are optically observed. In one class of such sensors, an array of a plurality of indicators that individually change color at different temperature thresholds is included, thus allowing the temperature of the surface to be observed by noting which of the indicators changed color and which did not. This type of sensor most commonly uses indicators that are not reversible, thereby to measure a peak temperature reached by the surface during a measurement. The peak temperature indicators are made from a powder material having a sharp melting point that is painted or printed onto a background of a dark or other contrasting color. When an indicator is raised to a threshold temperature of its melting point, the normally reflective powder, usually white, melts and is absorbed by the background material. The color of an indicator whose threshold melting temperature has been exceeded changes from white to dark. This type of peak temperature sensor is available from several manufacturers in the form of labels that are attached to a surface whose temperature is to be measured. The manufacturers include Wahl Instruments, Inc. of Culver City, Calif. Tempil, Inc. of South Plainfield, N.J, and Reatec AG of Dübendorf, Switzerland. Another type of available indicator in the same form changes its visual state when its temperature, integrated over a period of time (time-temperature integral), exceeds a designated threshold.

Such a label includes a number of indicators that are each formed of a quantity of material, sealed by a transparent plastic layer, that changes color at a different temperature in a range of temperature. The threshold temperatures are usually marked on the label adjacent the indicators. The temperature of the surface is determined by observing the indicator with the highest temperature marking that changes its color. The surface temperature is thus in between the threshold temperature of that indicator and that of an indicator having the next higher threshold temperature that remains with its color unchanged.

One application of these surface temperature measuring labels is to measure the temperature of semiconductor wafers during processing. One or more labels are attached to a surface of a semiconductor wafer or other conductive substrate prior to being placed into a processing chamber where it is cycled through a range of temperatures with which semiconductor wafers are normally processed therein. After being cycled through that temperature range, the substrate is removed from the processing chamber and the temperature of the wafer is determined by observing by the label(s), a peak temperature if their indicators are the non-reversible type.

SUMMARY OF THE INVENTION

A sensor of one or more parameters including, but not limited to, temperature, includes at least one indicator encapsulated within a rigid enclosure in order to protect the indicator from pressure, particles and other elements of the environment in which the sensor is to be used. The sensor is made for immersion in the environment in which the parameter is to be measured, made for attachment to a surface to measure the parameter, or one or more sensors are formed at different locations across a surface as an integral part of it. If it is temperature that is being sensed, the enclosure is thermally conductive in order to minimize any vertical and lateral temperature gradients across the sensor during temperature measurement. The enclosure is made to allow penetration therethrough by electromagnetic radiation between the indicator and an observer or measuring instrument positioned a distance from the sensor. If the indicator change due to the changing parameter is visual, at least an area of the sensor enclosure is made transparent to visible electromagnetic radiation.

In a specific form of a temperature sensor, the sensor is characterized by an observable passive optical property changing as a function of its temperature. A plurality of indicators of specific temperatures, such provided by adhering the above-described commercially available labels within the enclosure or by painting the indicator material on an inside of the enclosure, may be utilized. If these indicators are positioned in a plurality of compartments formed between a bottom substrate and a cover sealed thereto that together form the enclosure, the temperature gradient across the enclosure between the substrate and cover is minimized, which improves the accuracy of the measurements. The window of such a two part enclosure is typically made to be optically transparent in order to allow the indicators to be seen through the cover.

An important use of a temperature sensor in one of the forms summarized above is in the measurement of the temperature to which semiconductor wafers are subjected in integrated circuit processing equipment. It is further often desired to measure the temperature distribution across a wafer within a processing chamber of such equipment. A semiconductor wafer or other similarly thermally conductive substrate that has a number of the sensors positioned at various locations across one of its surfaces may be positioned within the processing chamber while the equipment is operated through at least a portion of a processing cycle where the temperature of the wafer is important. The sensor(s) on the substrate may be monitored during the processing cycle, if a window exists into the chamber, or a, peak temperature that each of the sensors reaches may be observed upon removal of the test substrate from the chamber after the processing is complete. Indicators of the amount of time that a sensor was at elevated temperatures (time-temperature integrals) may be used instead of, or in addition to, the peak temperature indicators. This allows the equipment to be adjusted if a desired temperature is not reached, exceeded or maintained, or in order to modify the temperature distribution across the substrate. The rigid structure of the sensor enclosure allows temperature to be measured in processing chambers that reach a very low pressure and/or that utilize a plasma that impacts the sensor enclosure with high energy ions, with minimal effect on the sensor indicators, thereby improving the accuracy of the temperature measurement in such an environment.

According to another aspect of the present invention, an optical reader of a sensor having an array of binary parameter indicators with different thresholds, such as the peak and/or time-integral temperature indicators described above, compares an imaged parameter dependent indicator pattern with a library of patterns in order to automatically determine and display the sensor peak temperature and/or duration. In the case of several such sensors distributed across a surface to measure its thermal distribution, for example, the temperatures and/or temperature durations of the various locations of the sensors are displayed on an image of the surface. Other types of displays, such as a contour thermal map, may alternatively be provided.

Other objects, features and advantages of the various aspects of the present invention are included in the following description of several embodiments thereof, which description should be taken in conjunction with the accompanying drawings.

BRIEF DESCRIPTION OF THE DRAWINGS

FIG. 1 shows in plan view two sensors attached to two different positions of a surface;

FIG. 2 is a cross-sectional view of FIG. 1, taken at section I—I thereof, that shows the sensor mounted on the surface;

FIG. 3 is a cross-sectional view of FIG. 1, taken at section I—I thereof, that shows the sensor built into the surface;

FIG. 4 is a plan view of a disc with many sensors attached across a surface of it;

FIG. 5 schematically illustrates a plasma processing machine vacuum chamber in which the disc of FIG. 4 with its sensors is positioned;

FIG. 6 is a front view of a specific embodiment of a sensor;

FIG. 7 is a cross-sectional view of the sensor of FIG. 6, taken at section II—II thereof;

FIG. 8 is a cross-sectional view of the sensor of FIG. 6, taken at section III—III thereof, FIGS. 9 and 10 show respective disks having sensors of different shapes positioned across a surface thereof, FIG. 11 illustrates different readings from two of the sensors of the type of FIGS. 6–8 when utilizing a particular type of sensor indicator;

FIG. 12 is a schematic block diagram of a system for reading the sensors of FIG. 11;

FIGS. 13 and 14 show different types of displays of sensor readings that can be given by the system of FIG. 12; and FIG. 15 is a front view of an alternate specific embodiment of a sensor.

DESCRIPTION OF EMBODIMENTS OF THE INVENTION

A specific implementation incorporating several aspects of the present invention is generally illustrated in the views of FIGS. 1–3, in two alternative embodiments of a sensor for measuring a parameter of a surface 11 of a solid object or of the environment in which the object surface is positioned. One embodiment 13' of a sensor is illustrated in the cross-sectional view of FIG. 2, and the other embodiment 13" is shown in FIG. 3. However, as shown by FIG. 1, these two embodiments appear to be the same in a plan view of the surface 11, so are indicated by a generic reference number 13. A second sensor 15 having one of the same two alternative structures is positioned on the surface 11 a distance removed from the sensor 13.

In each of the sensors 13' (FIG. 2) and 13" (FIG. 3), a sensing element or indicator 17 is encapsulated by a rigid enclosure. A cover 19 seals a compartment containing the parameter sensing element. That compartment is formed in the sensor 13' (FIG. 2) by a base 21' with the cover attached to it by an adhesive layer 23'. The sensor 13' is attached to the surface 11' by a layer 25' of adhesive. The compartment of the sensor 13" (FIG. 3) that contains the sensing element 17, on the other hand, is provided by a cavity formed in the surface 11" and the cover 19 attached directly to the surface 11" around the cavity by an adhesive layer 23". The second sensor 13 is in the same form, with a quantity of sensing element 27 and a cover 29. Additional such sensors can be distributed across the surface 11 in order to obtain multiple measurements of a parameter of interest across the surface 11.

The sensing element 17 is chosen to have a detectable characteristic which changes in a known way as a function of a parameter being measured. The example that is primarily described herein is that of measuring temperature but other parameters can alternatively be measured by the sensor structures described. The changing characteristic should also be detectable in a convenient manner, preferably for most applications without having to connect wires, optical fibers or other physical media to the sensor. Wireless transmission by a parameter related signal in the radio frequency, infrared or some other portion of the electromagnetic radiation spectrum is certainly a possibility. It is usually most convenient when the sensing element itself provides the parameter related radiation signal, rather than using another type of sensor whose signal is converted to the radiation signal provided by the sensor. An example is a sensing element that emits radiation having a detectable characteristic related to the parameter being measured, such as a luminescent material, but it is usually simpler and more convenient to employ a sensing element having a detectable passive change. A sensing element 17 that changes some observable optical characteristic in an amount related to the measured parameter, such as color, refractive index, reflectivity and the like, is conveniently employed. The radiation signal provided by the sensing element 17 is then radiation that is reflected from it or transmitted through it.

A specific example of such a sensing element for measuring temperature is that described previously which has a sharp melting point that causes its color to change from one to another. Another example is a thermal chromic material which changes color over a continuum of colors as a function of temperature. A further example is a spring or beam that is held with a temperature sensitive adhesive that releases the spring to visibly deflect upon a predefined temperature being reached. Another sensor element example uses two or more reactive chemicals separated by a temperature sensitive membrane, with the membrane allowing the two chemicals to mix at a certain temperature, thereby to cause a change to occur that can be recognized visually or through some chemical or physical analysis. Yet a further example is a sensor that employs printed electrically conductive traces that expand or melt under temperature changes in a manner to cause a short in an electrical circuit provided as part of the sensor. For particular applications, such temperature sensors that measure peak temperature are conveniently combined with those which measure a time-temperature integral.

In cases where a radiation signal is observed from the sensing element 17 as an indication of the parameter being measured, some part of the sensor enclosure is made to be transparent to that radiation. In the case of visible or near visible radiation, the cover 19 of the sensors of FIGS. 1–3 is conveniently made to be of an optically transparent material. In the sensor embodiment 13' of FIG. 2, the base 21' may also be made of an optically transparent material but it is not necessary to do so. In both of the sensor embodiments 13' and 13", the respective objects 10' and 10" will usually be opaque but can also be transparent to electromagnetic radiation in the visible range.

The sensor enclosures are also made to withstand any adverse conditions in an environment in which the sensors may be used. Depending upon the particular sensing element 17, it may be desirable to protect that element from particles that can, if allowed to impact it, affect the accuracy with which it measures the parameter of interest. Protection from ions in a plasma in which a sensor is positioned is a specific example. Since some sensor materials utilized to measure a parameter other than pressure are nonetheless sensitive to pressure, protection against the effects of a changing ambient pressure is also often desired. These protections are provided the sensing element 17 when its enclosure is made of a rigid material and sealed the compartment containing the sensing element 17 from outside of the sensor. If temperature is a parameter being measured, the entire enclosure is preferably made from materials having a high degree of thermal conductivity in order to avoid thermal gradients developing across the sensor that can distort a temperature reading from the sensing element 17.

In order to better explain various aspects of the present invention, an example using a plurality of such sensors 31–39 positioned across a surface of a substrate 41 for measuring thermal characteristics is given with respect to FIGS. 4 and 5. The substrate 41 preferably has the same size as production device wafers being processed by processing equipment 43. The substrate 41 can be a blank semiconductor wafer or a substrate of other material that has similar thermal properties to those of the semiconductor wafer. The individual sensors 31–39 may be attached to the surface of the substrate 41 as the sensor 13' (FIG. 2), or may be built into the substrate surface in the manner of the sensor 13" (FIG. 3). The processing equipment 43 illustrated in FIG. 5 is of a type that generates a plasma within a vacuum chamber 45 to either etch material from one or more wafers at one time, or to deposit material on one or more wafers at a time. In this and other types of semiconductor wafer processing equipment, the temperature of the wafers during processing is quite important, as is any variation of temperature across the individual wafers. Thus, the sensors 31–39 are distributed across a surface of the substrate 41 in a pattern that provides representative temperature readings across the entire substrate surface.

The chamber 45 of the example processing machine of FIG. 5 includes parallel electrodes 47 and 49 that are driven by a radio frequency power source 51. A vacuum pump 53 maintains a very low pressure within the chamber 45 during processing. The bottom plate 49 is usually cooled, and this is accomplished by circulating a liquid in a closed path by a pump 57 through a refrigeration source and through the bottom reactor plate 49. A single wafer is processed at a time, and is inserted into and removed from the chamber 45 through a vacuum locked opening 61. The wafer being processed rests on the bottom plate 49. Also, a helium gas stream is often introduced between the substrate 41 and the plate 49 for additional cooling of the substrate. The same position is chosen for the test substrate 41 in FIG. 5. A reactive gas is introduced into the chamber 45 from a source 63, and directed against the wafer being processed. A plasma is generated between the two plates 41 and 47.

In the course of testing the processing equipment, the test substrate 41, with its plurality of temperature sensors, is subjected to at least the components of a normal process that affect the temperature of a wafer therein. After such a process is completed, the test substrate 41 is removed from the chamber 43 and the temperature information provided by its sensors 31–39 is obtained. Since no wires, optical fibers or other connection needs to be made with the test substrate while it is in the chamber 45, the substrate 41 is simply inserted into and removed from the processing chamber 45 in the same manner as wafers that are processed. This is usually by an automatic mechanism. The chamber need not be opened to the atmosphere to insert or remove the test substrate, thus avoiding the long process of pumping down the chamber that is normally required each time a test wafer with leads attached is moved into or out of such a chamber. Although the chamber shown in FIG. 5 is of a type that processes one wafer at a time, other processing chambers handle multiple wafers at a time, typically inserted and removed in a wafer boat. The test substrate of FIG. 4 is similarly inserted into and removed from this type of chamber in the same manner as the wafers being processed.

Because of the significant cost of shutting down processing equipment when a test wafer with leads is used, a less accurate test wafer is commonly used where temperature sensing labels of the type previously discussed in the Background are adhered directly to one surface of the test wafer at locations spaced apart across it. Such commercially available labels have their indicators, formed of quantities of sharp melting point materials, formed in a row or in a two-dimensional pattern. An optically transparent plastic tape is normally applied over the individual labels and adhered to them and to portions of the substrate surrounding them. Such a test wafer is then inserted into a processing chamber, in the same manner as the test substrate 41 described with respect to FIG. 5, with the peak temperatures observed from the individual labels after the wafer is removed from the processing chamber.

It has been found that these label sensors can be very inaccurate when used to test or calibrate integrated circuit processing equipment, particularly the type illustrated in FIG. 5. It is believed the inaccuracy is the result of two primary factors. One factor is the existence of very small air bubbles trapped under the label where it is attached by pressure sensitive adhesive to the wafer or other substrate before being inserted into the processing chamber. When inserted into a chamber that operates at a very low pressure, these air bubbles enlarge and separate at least a portion of the label from the substrate, thereby interrupting a desired good thermal coupling between the substrate surface and the temperature indicators of the labels. Another factor is the absorption of thermal energy by the labels of ions that strike the labels during a test within a plasma. This causes the labels to be heated directly by the impinging ions which is unrelated to the substrate surface temperature that is desired to be accurately measured.

These disadvantages are minimized if the label is enclosed in a compartment as part of a sensor of the type previously described with respect to FIGS. 1–3. According to a very specific embodiment of the present invention, such an improved sensor is illustrated in detail in FIGS. 6–8 as one of many that are distributed across a surface 67 of a test substrate 69. A plurality of parallel channels 71–76 are formed in the surface 67, leaving walls separating the channels that extend from their bottom surfaces to the original surface of the substrate. Strips of the temperature sensing labels are adhered to the bottoms of the channels. Although the channels in which the temperature indicators are placed are shown in FIGS. 6–8 to be linear and parallel with each other, they can be circular, a single channel in a spiral shape, formed of a number of smaller indentations in a linear or circular pattern, or other convenient shape. FIG. 15 shows a modification of the sensor of FIGS. 6–8, wherein the plurality of linear and parallel channels 71–76 are replaced by a single channel 201 having a spiral shape.

The temperature thresholds of the individual indicators, which commonly melt at a temperature within one degree Celsius of a designated threshold, can be selected with 2 to 3 degree steps, for example. This is indicated in FIG. 6, where a threshold temperature of each of 38 indicators is indicated, as an example, providing a measurement range of 86–160 degrees Celsius with a resolution of two degrees. This is quite an adequate resolution for testing or calibrating semiconductor processing equipment, although the specific temperature range depends upon the application. When a large temperature range is desired, large steps between indicators can be chosen in order to maintain a small sensor size. When it is desired to be able to visually read the temperature of such a sensor, these temperature thresholds are marked on the strips adjacent their respective indicators.

The position of the label within the substrate channel 73, as best shown in FIG. 8, will now be described as exemplary. A supporting strip 81 has a pressure sensitive adhesive layer 83 on one side that provides attachment to the bottom of the channel. A number of temperature indicators with different temperature thresholds are carried by another side of the supporting strip 81. The strip 81 is made to be black for indicators that are white before melting but may be some other color that contrasts with the color of the indicators before melting. An optically transparent and rigid cover 85 is attached to the substrate surface 67 in areas adjacent the channels, including tops of the walls separating them, by an appropriate adhesive layer 87. Sapphire is an appropriate transparent material for the cover 85 because it is rigid and has a high degree of thermal conductivity. Since the substrate 69 also has a high degree of thermal conductivity, any vertical gradient of temperature that could otherwise be imparted by a non-uniform environment is minimized. The cover 85 should also be chemically inert.

The channels 71–76 are preferably made deep enough to leave a space 89 between a top of the indicators and an underside of the cover 85, in order to assure that the indicators are not subjected to pressure which can change their melting temperature thresholds. Also, the space prevents coating of the inner surface of the cover by liquid indicator material. Positioning the temperature indicators in such channels or other recesses of the substrate provides very good thermal communication between the substrate and the indicators. Further, by sealing the channels with the cover 85, the introduction of contaminants from the sensors into the processing chamber is avoided.

Many variations of the specific construction of the sensor of FIGS. 6–8 are possible. For example, the meltable indicator material may be painted onto the bottom of the channels after being made a contrasting color, instead of adhering labels. Further, each indicator can be placed in its own hole formed by adding walls between each of the indicators along the lengths of the channels 71–76. Of course, fewer or more indicators can be provided in each sensor, depending upon the application. Further, indicators for two or more different temperature ranges, rather than the one range of the sensor of FIGS. 6–8, may be included in order to extend the life of the test substrate. Such a substrate would first be used to test within its lower temperature range, which would leave the indicators of its higher range untouched, followed by using the same substrate to perform a test within its higher temperature range.

In addition to the peak temperature sensors being described, time-integral indicators can also be included in each sensor in order to provided two types of thermal information upon removal of the test substrate from the chamber or other environment being tested. A time-temperature integral indicator can be a material that undergoes a thermal diffusion process, a thermal oxidation process, or a polymerization process while in the processing chamber during a test.

FIGS. 9 and 10 are views of two test wafers having temperature sensors of the type described with respect to FIGS. 6–8 formed in a common pattern thereacross but with different shapes. Many variations are possible.

FIG. 11 shows the visual state of two surface temperature sensors 91 and 93, both as described with respect to FIGS. 6–8, after a test is completed. The highest melting temperature indicator of the sensor 91 that has melted and thus appears black has a threshold of 128 degrees Celsius, so the peak temperature reached by the sensor 91 is indicated to have been between 128 degrees and the 130 degree threshold of the adjacent indicator that did not melt. Similarly, the indicators of the sensor 93 indicate a peak temperature of between 140 and 142 degrees Celsius.

Although it is currently common for the temperature indicator labels to be visually read after use, this function can also be automated to some extent. This is illustrated in FIG. 12, where sensors of the type of FIGS. 6–8 on one side of a test substrate 95 are viewed by a video camera 97. If there is not enough ambient light, a light source 99 is-used to illuminate the surface being viewed. The picture is then processed by a computer which compares the indicator patterns of each of the sensors, which are in a form shown in FIG. 11, with a library of all possible patterns. There are 37 such possible patterns for the sensor of FIGS. 6–8, one less than the number of indicators. The temperature reached by a sensor is thus that of the library pattern which it matches.

The results of this temperature determination are displayed on a monitor 103, an example video screen display being shown in FIG. 13 where the temperature of each sensor is indicated numerically on an image of the test substrate at a location that corresponds to the position of the sensor on the substrate. Alternatively, or in addition, a contour map of a temperature distribution across the test substrate may be calculated by the computer 101 and displayed on the monitor 103, as shown in FIG. 14.

Another advantage of using video equipment to read the pattern of the indicator arrays is that the arrays can be made smaller than is convenient for viewing with an unaided eye, without having to use a microscope. And, of course, space need not be provided to mark the temperature threshold values of the indicators within the sensor.

Although the various aspects of the present invention have been described with respect to various embodiments, it will be understood that the invention is entitled to protection within the full scope of the appended claims.

It is claimed:

1. A method of testing the temperature distribution imparted on a semiconductor wafer during processing within a plasma processing chamber, comprising:

providing a test substrate having a plurality of temperature sensors positioned across one surface thereof, wherein each of the plurality of sensors includes a plurality of optical indicators of a plurality of different peak temperatures sealed in at least one compartment of a thermally conductive enclosure having a rigid optically transparent window facing out away from the substrate surface, positioning the test substrate with the plurality of sensors within the plasma processing chamber, thereafter operating the plasma processing chamber in a vacuum and in a manner corresponding to its operation when processing semiconductor wafers, wherein the optical indicators are sealed within said at least one compartment of the sensors sufficiently for the plurality of different peak temperatures of the optical indicators to be substantially unaffected by a pressure difference experienced by the test substrate, thereafter removing the test substrate from the plasma processing chamber, and thereafter observing through the windows of the sensors patterns of optical characteristics of the indicators therein, thereby to determine peak temperatures reached by the test substrate at the positions of the sensors.

2. The method of claim 1, wherein providing the test substrate additionally includes providing the test substrate with said at least one compartment of each of the plurality of sensors being formed by a recess in a surface of the substrate and the transparent window attached to the substrate surface around the recess.

3. The method of either of claims 1 or 2, wherein observing patterns of optical characteristics of the indicators includes imaging the patterns of the sensors and individually comparing those patterns by computer processing with a library of patterns indicating specific temperatures.

4. A temperature measurement system, comprising:

a substrate, and a plurality of temperature sensors positioned at spaced apart locations across at least one surface of the substrate, the temperature sensors individually including:

a plurality of channels formed adjacent one another into said at least one substrate surface with portions of the substrate remaining as walls between the channels, a rigid thermally conductive and visible radiation transparent cover attached to said at least one surface adjacent the channels and to tops of the walls between them in a manner to seal the tops of the channels, and a plurality of indicators attached to bottom surfaces of the channels with spaces between top surfaces of the indicators and an underside of the cover, the indicators individually having a physical characteristic that visibly changes in an abrupt and irreversible manner as the sensor is raised above a threshold temperature that is different from threshold temperatures wherein the physical characteristic of other indicators visibly change, the indicators being arranged within the channels of the individual sensors to form visible patterns for the plurality of sensors that are unique for individual ones of the threshold temperatures, wherein the plurality of channels are individually elongated in a common direction and arranged with their long sides positioned adjacent one another, the walls being positioned between the channels along their long sides, and wherein a plurality of indicators are positioned in individual ones of the plurality of channels along their lengths, thereby to arrange the indicators within the individual sensors with their unique visible patterns in two-dimensions.

5. The temperature measurement system of claim 4, which additionally comprises a reader including a video substrate imaging device that compares the visual pattern of the individual plurality of sensors to a library of patterns corresponding to specific temperature values, and displays an image of the substrate with indications of the temperatures of the plurality of sensors overlying the substrate image at locations of the sensors thereacross.

6. The temperature measurement system of claim 4, wherein the physical characteristic of the plurality indicators that visibly changes includes their color.

7. The temperature measurement system of claim 4, wherein the substrate is a semiconductor wafer.

8. A temperature measurement system, comprising:

a substrate, and a plurality of temperature sensors positioned at spaced apart locations across at least one surface of the substrate, the temperature sensors individually including:

a plurality of channels formed adjacent one another into said at least one substrate surface with portions of the substrate remaining as walls between the channels, a rigid thermally conductive and visible radiation transparent cover attached to said at lest one surface adjacent the channels and to tops of the walls between them in a manner to seal the tops of the channels, and a plurality of indicators attached to bottom surfaces of the channels with spaces between top surfaces of the indicators and an underside of the cover, the indicators individually having a physical characteristic that visibly changes in an abrupt and irreversible manner as the sensor is raised above a threshold temperature that is different from threshold temperatures wherein the physical characteristic of other indicators visibly change, the indicators being arranged within the channels of the individual sensors to form visible patterns for the plurality of sensors that are unique for individual ones of the threshold temperatures, and wherein the plurality of indicators are attached to the bottom surfaces of the channels by a pressure sensitive adhesive layer carried by a back side of the indicators.

9. The temperature measurement system of claim 8, wherein the plurality of indicators are arranged such that the unique visible patterns are two-dimensional.

10. A temperature measurement system, comprising:

a substrate, and a plurality of temperature sensors positioned at spaced apart locations across at least one surface of the substrate, the temperature sensors individually including:

a cavity formed into said at least one surface of the substrate, wherein the cavity is formed of a plurality of channels arranged adjacent one another with portions of the substrate remaining as walls between the channels, a rigid thermally conductive and visible radiation transparent cover attached to the substrate in a manner to seal the cavity, and a plurality of indicators attached to a bottom surface of the cavity with spaces between top surfaces of the indicators and an underside of the cover, the indicators individually having a physical characteristic that visibly changes in an abrupt and irreversible manner as the sensor is raised above a threshold temperature that is different from threshold temperatures wherein the physical characteristic of other indicators visibly change, the indicators being arranged within the sensor cavity to form visible two-dimensional patterns among the plurality of sensors that are unique for individual ones of the threshold temperatures, and wherein a plurality of the indicators are positioned in individual ones of the plurality of channels.

11. The temperature measurement system of claim 10, which additionally comprises a reader including a video substrate imaging device that compares the visual pattern of the individual plurality of sensors to a library of patterns corresponding to specific temperature values, and displays an image of the substrate with indications of the temperatures of the plurality of sensors overlying the substrate image at locations of the sensors thereacross.

12. The temperature measurement system of claim 10, wherein the substrate is a semiconductor wafer.

13. The temperature measurement system of claim 10, wherein the plurality of channels forming the cavity of the individual temperature sensors are linearly elongated.

14. A temperature measurement system, comprising:

a substrate, and a plurality of temperature sensors positioned at spaced apart locations across at least one surface of the substrate, the temperature sensors individually including:

a cavity formed into said at least one surface of the substrate, a rigid thermally conductive and visible radiation transparent cover attached to the substrate in a manner to seal the cavity, and a plurality of indicators attached to a bottom surface of the cavity with spaces between top surfaces of the indicators and an underside of the cover, the indicators individually having a physical characteristic that visibly changes in an abrupt and irreversible manner as the sensor is raised above a threshold temperature that is different from threshold temperatures wherein the physical characteristic of other indicators visibly change, the indicators being arranged within the sensor cavity to form visible two-dimensional patterns among the plurality of sensors that are unique for individual ones of the threshold temperatures, and wherein the plurality of indicators are attached to the bottom surface of the cavity by a pressure sensitive adhesive layer carried by a back side of the indicators.

15. A temperature measurement system, comprising:

a substrate, and a plurality of temperature sensors positioned at spaced apart locations across at least one surface of the substrate, the temperature sensors individually including:

a spiral channel formed into said at least one substrate surface, a rigid thermally conductive and visible radiation transparent cover attached to said at least one surface adjacent the channel in a manner that seals the channel, and a plurality of indicators attached to a bottom surface of the channel with spaces between top surfaces of the indicators and an underside of the cover, the indicators individually having a physical characteristic that visibly changes in an abrupt and irreversible manner as the sensor is raised above a threshold temperature that is different from threshold temperatures wherein the physical characteristic of other indicators visibly change, the indicators being arranged along the channel to form visible two-dimensional patterns that are unique for individual ones of the threshold temperatures.

16. The temperature measurement system of claim 15, which additionally comprises a reader including a video substrate imaging device that compares the visual pattern of the individual plurality of sensors to a library of patterns corresponding to specific temperature values, and displays an image of the substrate with indications of the temperatures of the plurality of sensors overlying the substrate image at locations of the sensors thereacross.

17. The temperature measurement system of claim 15, wherein the physical characteristic of the plurality indicators that visibly changes includes their color.

18. A temperature measurement system of claim 15, wherein the plurality of indicators are attached to the bottom surfaces of the channels by a pressure sensitive adhesive layer carried by a back side of the indicators.

19. The temperature measurement system of claim 15, wherein the substrate is a semiconductor wafer.

* * * * *